US008651433B2

(12) United States Patent
Ghaly

(10) Patent No.: US 8,651,433 B2
(45) Date of Patent: Feb. 18, 2014

(54) METHOD AND APPARATUS FOR A HYBRID TRAIN CONTROL DEVICE

(75) Inventor: Nabil Ghaly, S. Huntington, NY (US)

(73) Assignee: Siemens Industry, Inc., Alpharetta, GA (US)

( * ) Notice: Subject to any disclaimer, the term of this patent is extended or adjusted under 35 U.S.C. 154(b) by 92 days.

(21) Appl. No.: 13/200,574

(22) Filed: Sep. 26, 2011

(65) Prior Publication Data

US 2012/0018591 A1    Jan. 26, 2012

Related U.S. Application Data

(63) Continuation of application No. 12/454,398, filed on May 19, 2009, now Pat. No. 8,200,380.

(51) Int. Cl.
*B61L 3/00*    (2006.01)
*G05D 1/00*    (2006.01)

(52) U.S. Cl.
USPC ........................................ 246/167 R; 701/19

(58) Field of Classification Search
USPC ............ 701/19, 20; 246/2 R, 3–5, 14, 20, 27, 246/122 R, 123, 167 R, 174, 175
See application file for complete search history.

(56) References Cited

U.S. PATENT DOCUMENTS

| 4,566,067 | A | 1/1986 | DiSilvestro | |
|---|---|---|---|---|
| 5,452,870 | A | 9/1995 | Heggestad | |
| 6,732,023 | B2 * | 5/2004 | Sugita et al. | 701/19 |
| 7,269,487 | B2 * | 9/2007 | Watanabe et al. | 701/19 |
| 2010/0063656 | A1 * | 3/2010 | Knott et al. | 701/19 |

* cited by examiner

*Primary Examiner* — R. J. McCarry, Jr.

(57) ABSTRACT

A method and an apparatus for an on-board train control device are provided, and are based on converting speed codes received from wayside cab-signaling devices into movement authority limits. The device determines the train location independent of the wayside train detection system, and generates and enforces stopping profiles based on said movement authority limits.

15 Claims, 14 Drawing Sheets

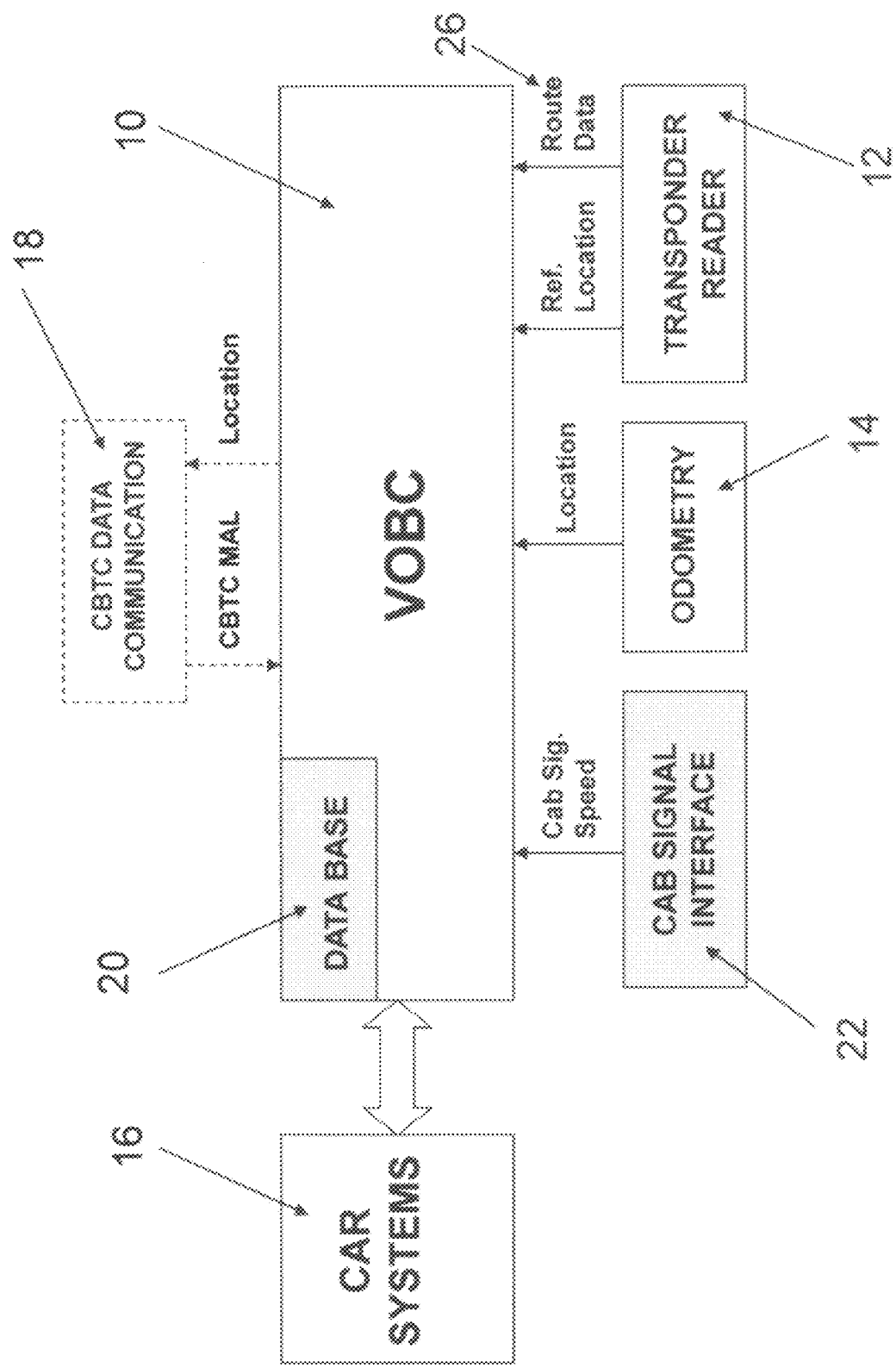
Figure — 1 —

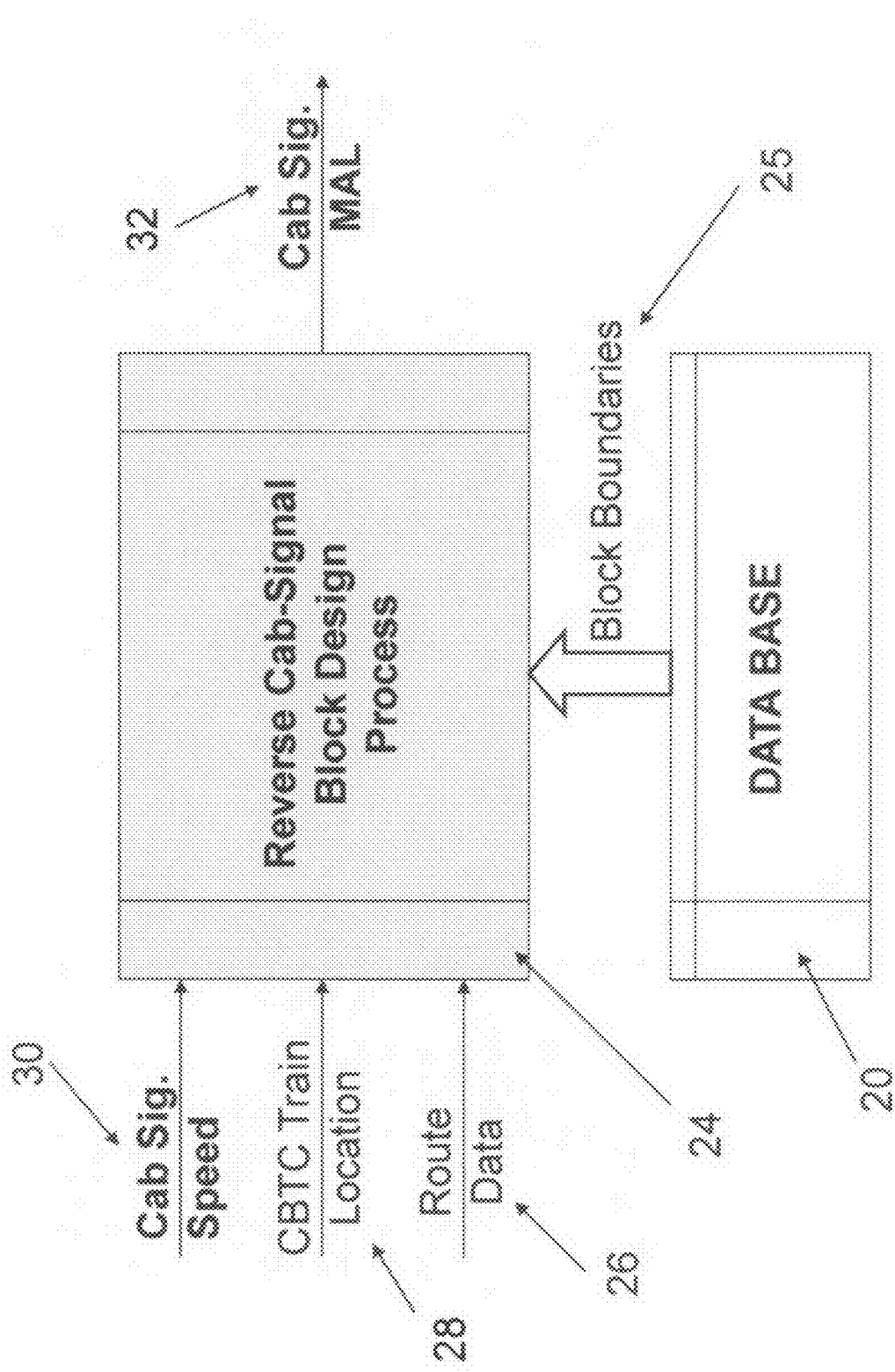
Figure — 2 —

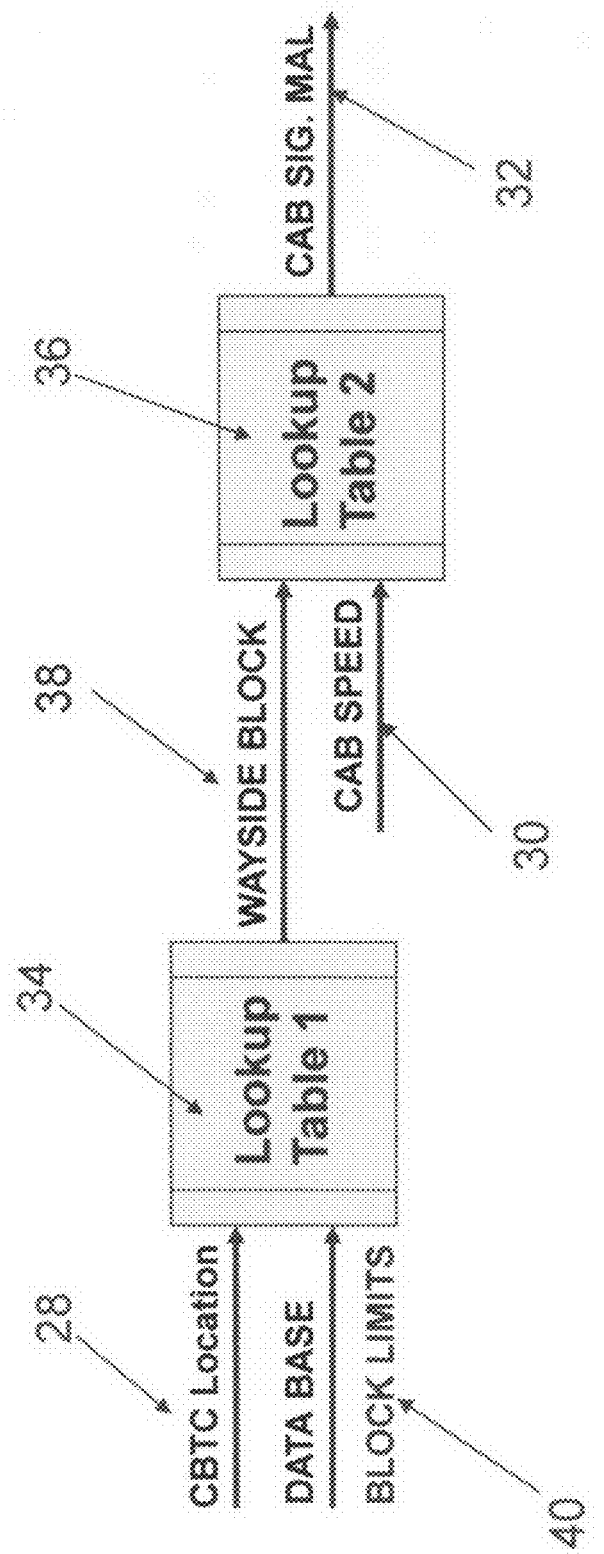
Figure — 3 —

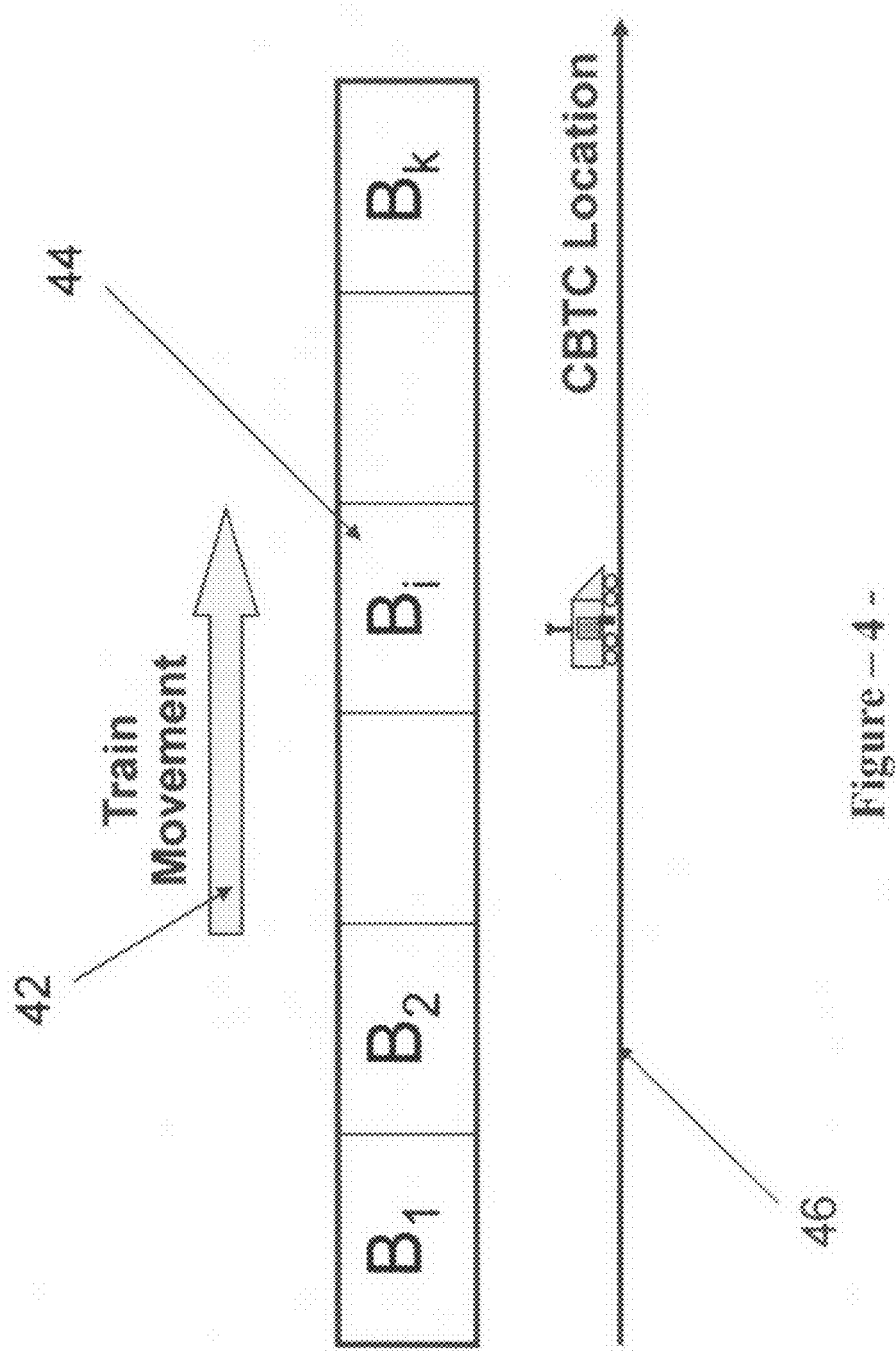
Figure — 4 —

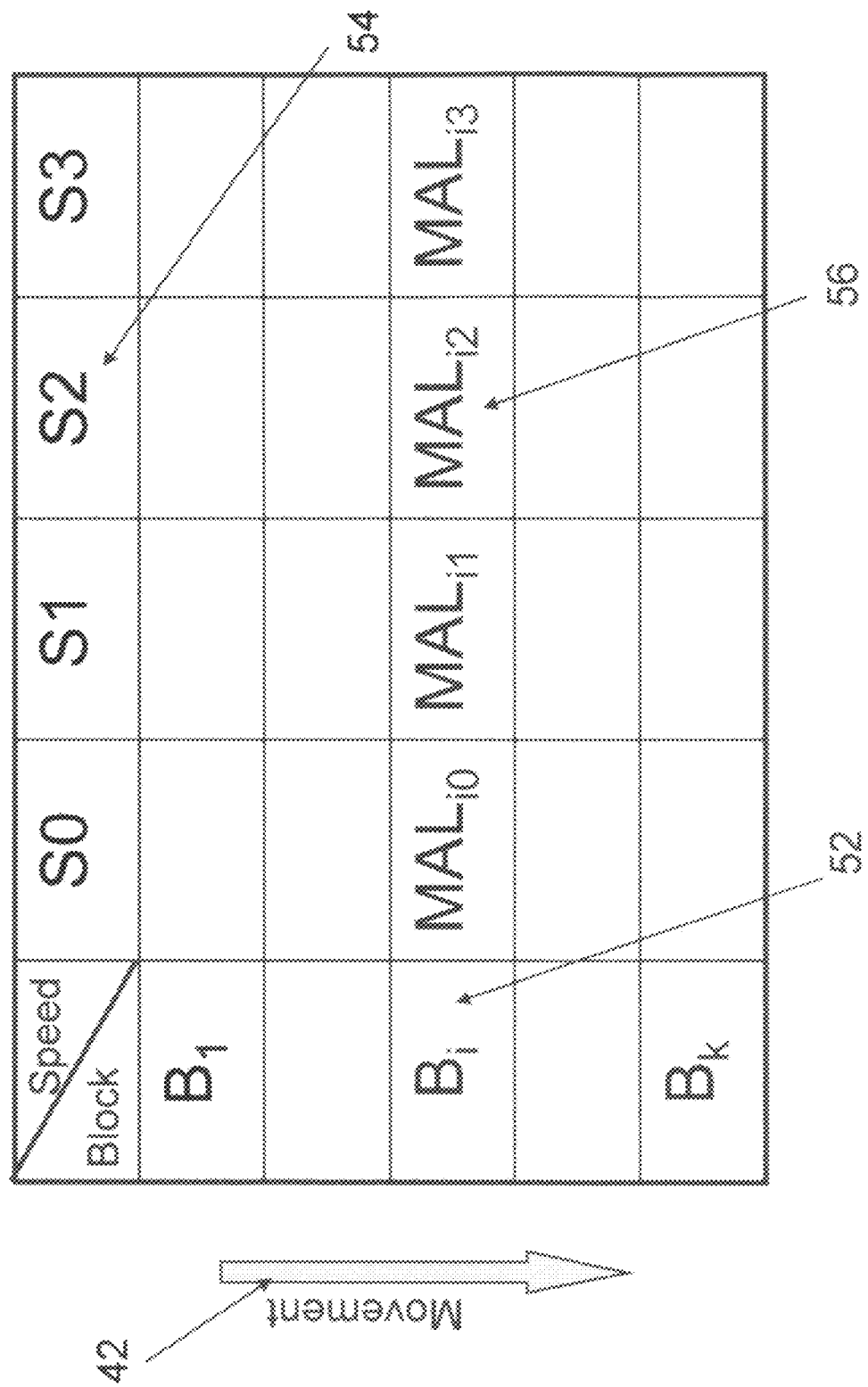
Figure — 5 —

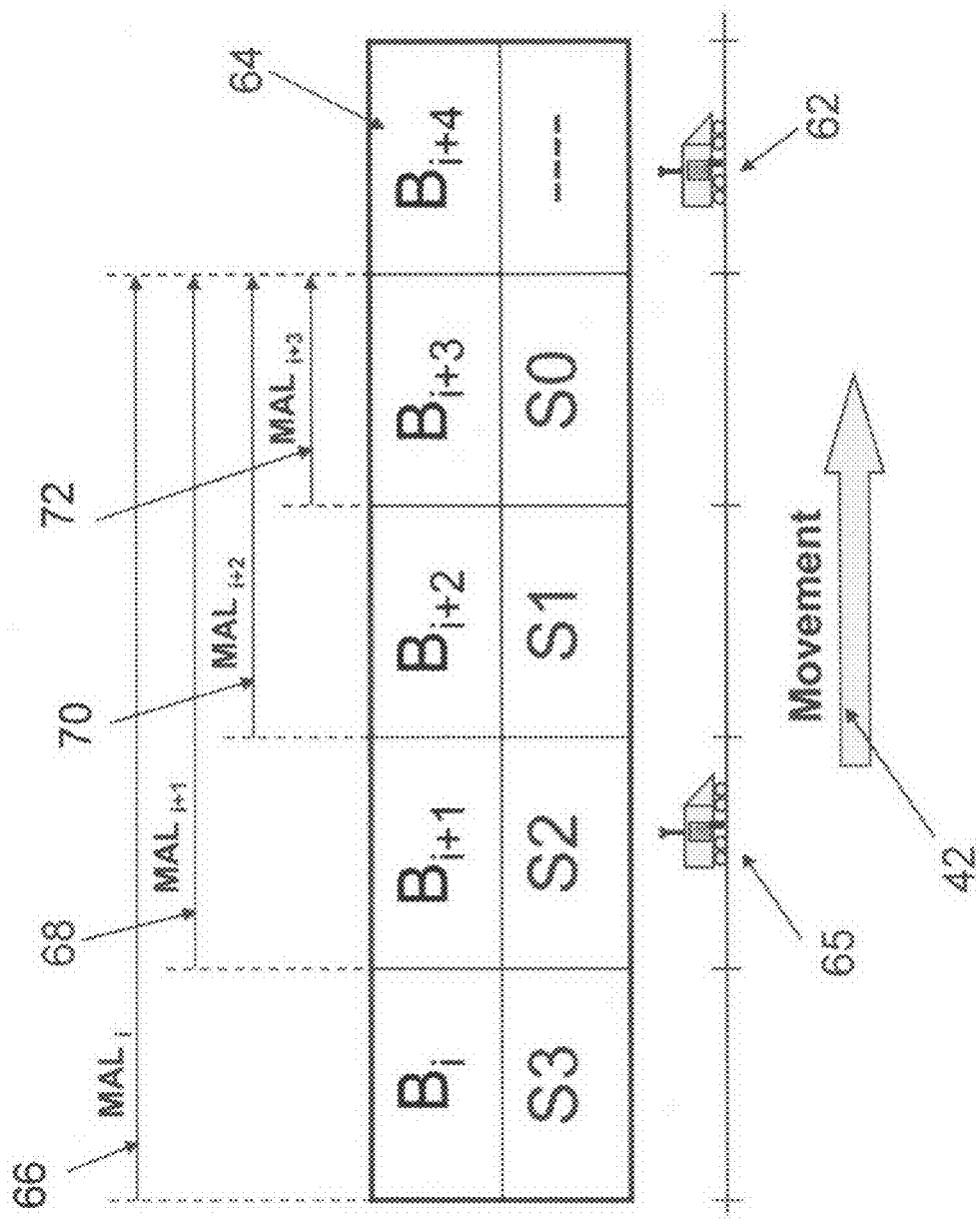
Figure – 6 –

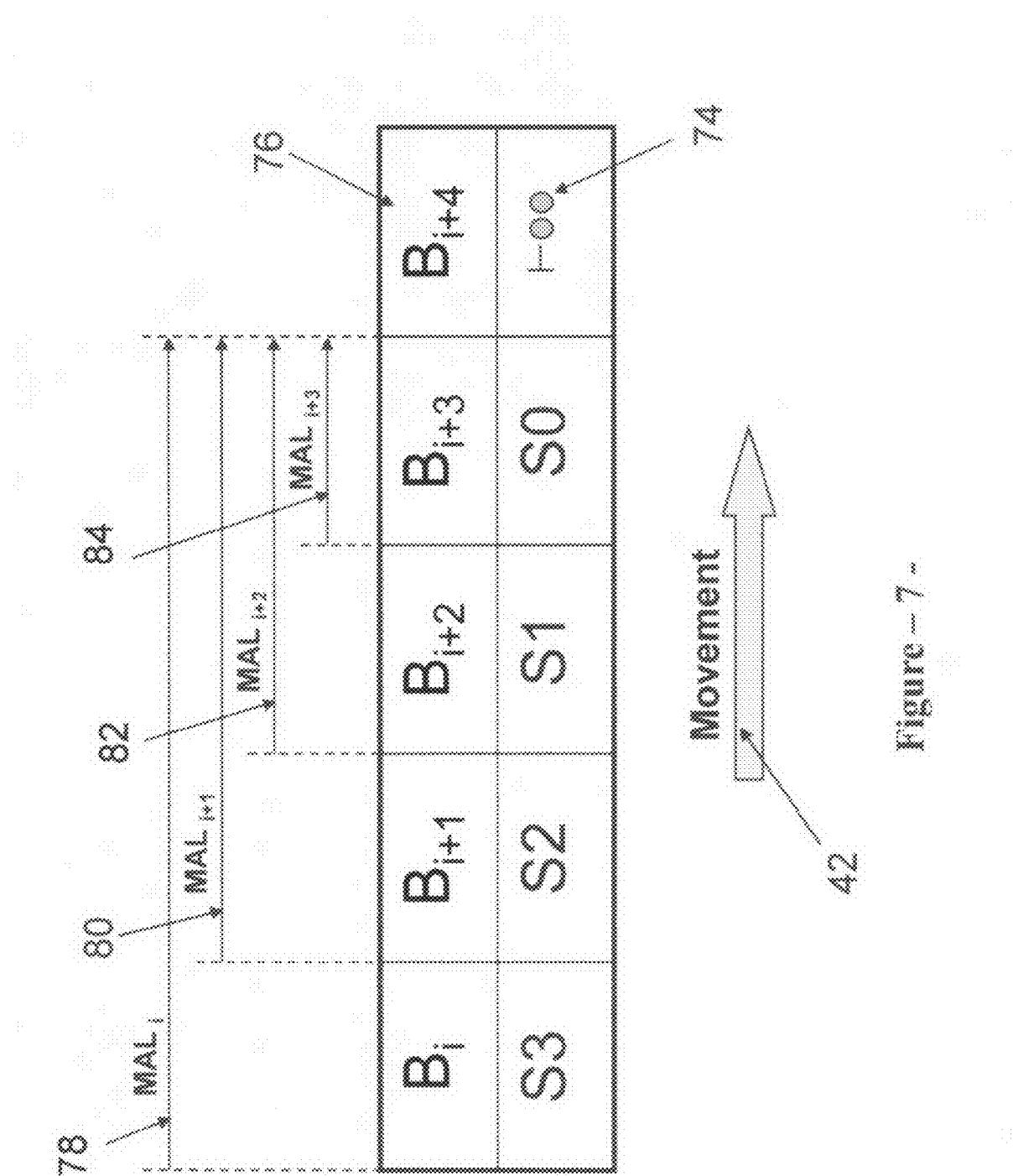
Figure — 7 —

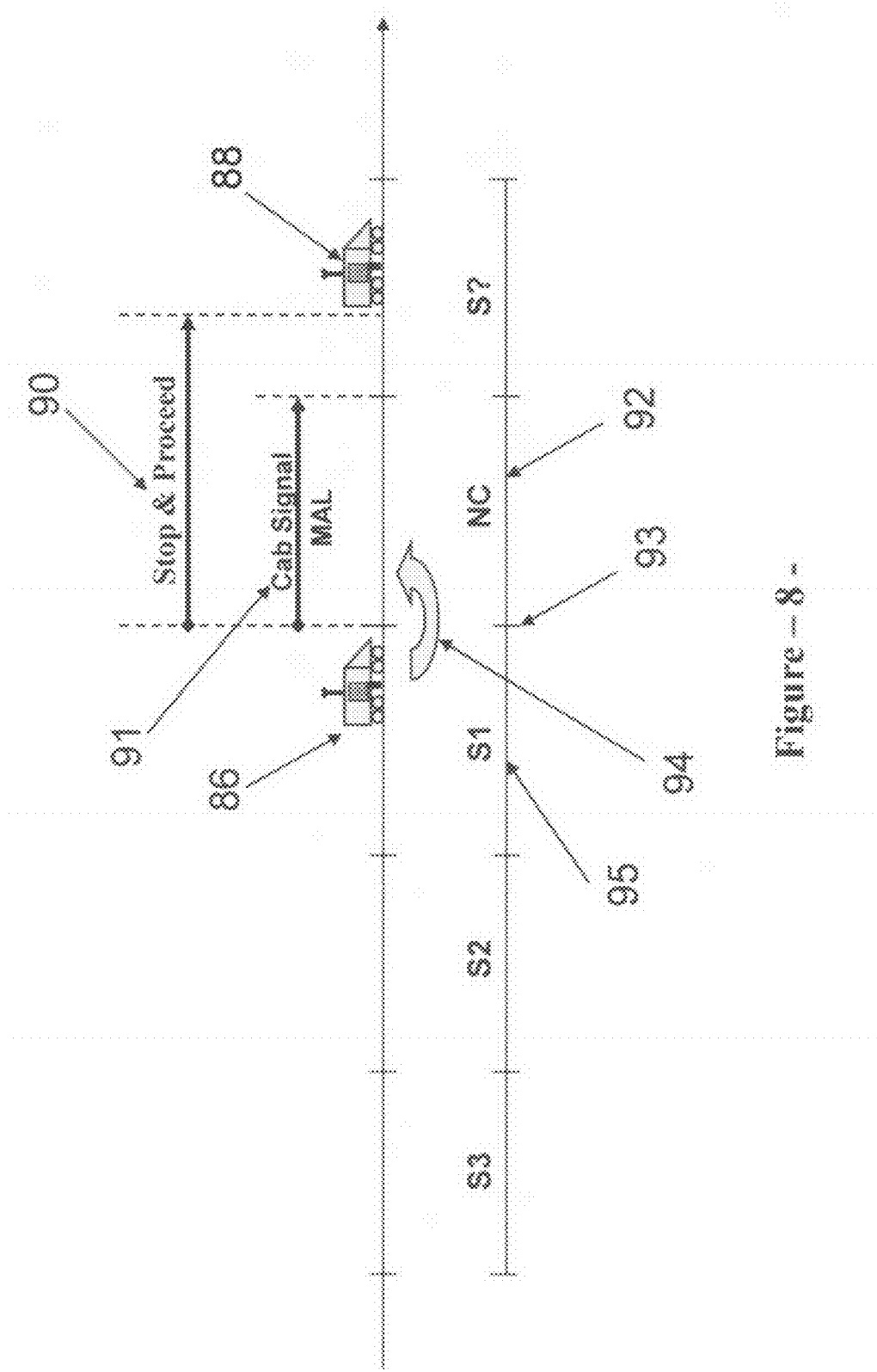

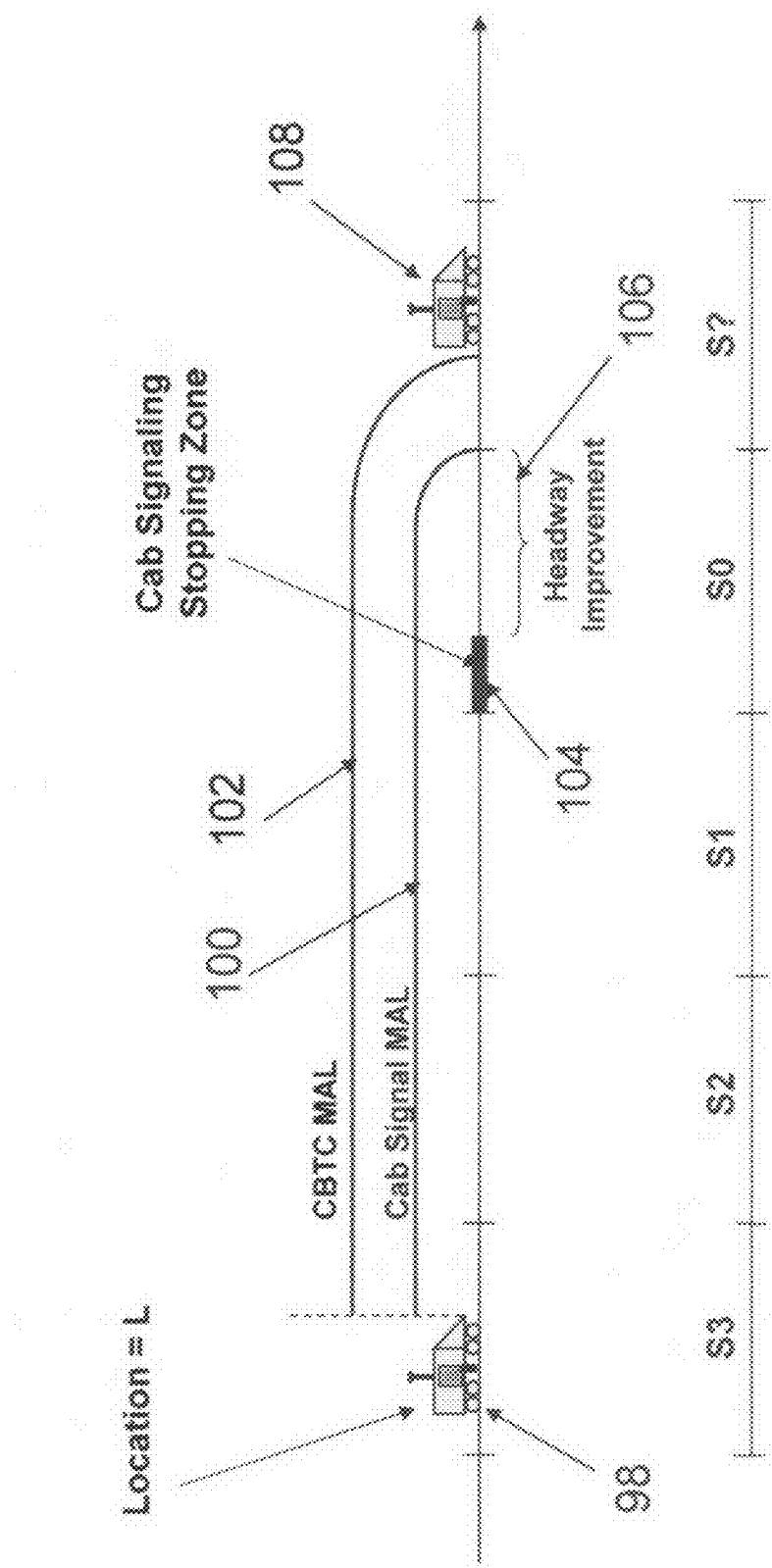
Figure — 9 —

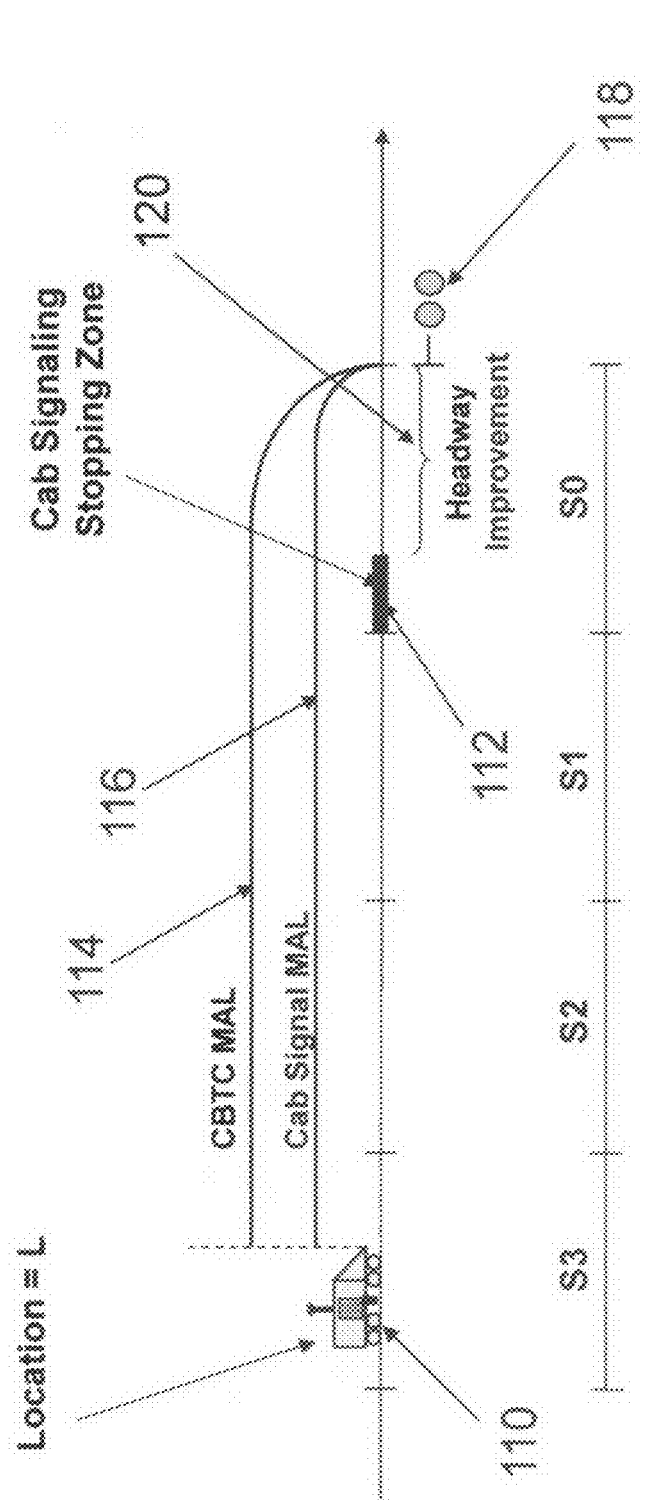
Figure — 10 —

| Block \ Speed | S1 | S2 | S3 | NC Operation |
|---|---|---|---|---|
| $B_1$ | | | | Stop & Proceed |
| $B_i$ | $MAL_{i1}$ | $MAL_{i2}$ | $MAL_{i3}$ | Positive Stop |
| $B_k$ | | | | Stop & Proceed |

42 → Movement →

Figure — 11 —

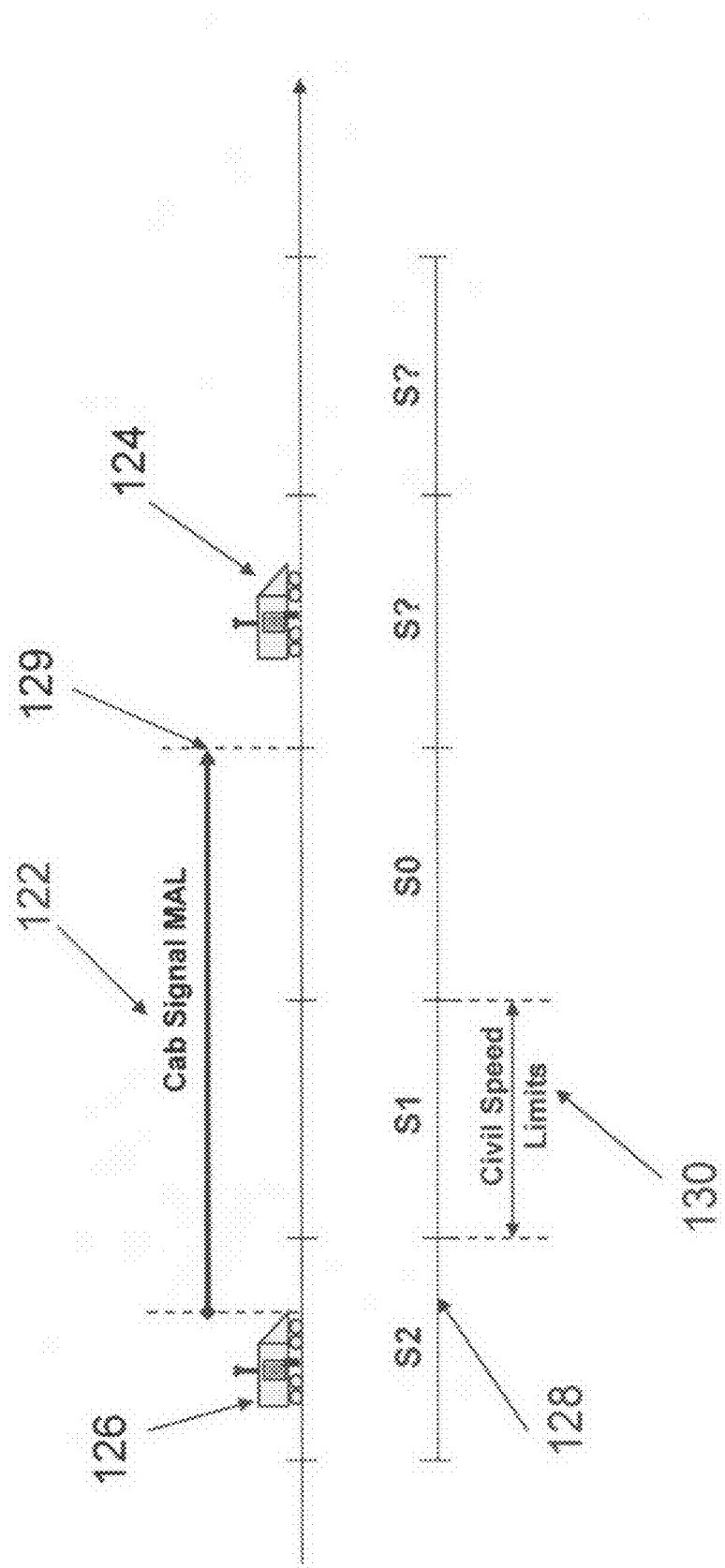
Figure — 12 —

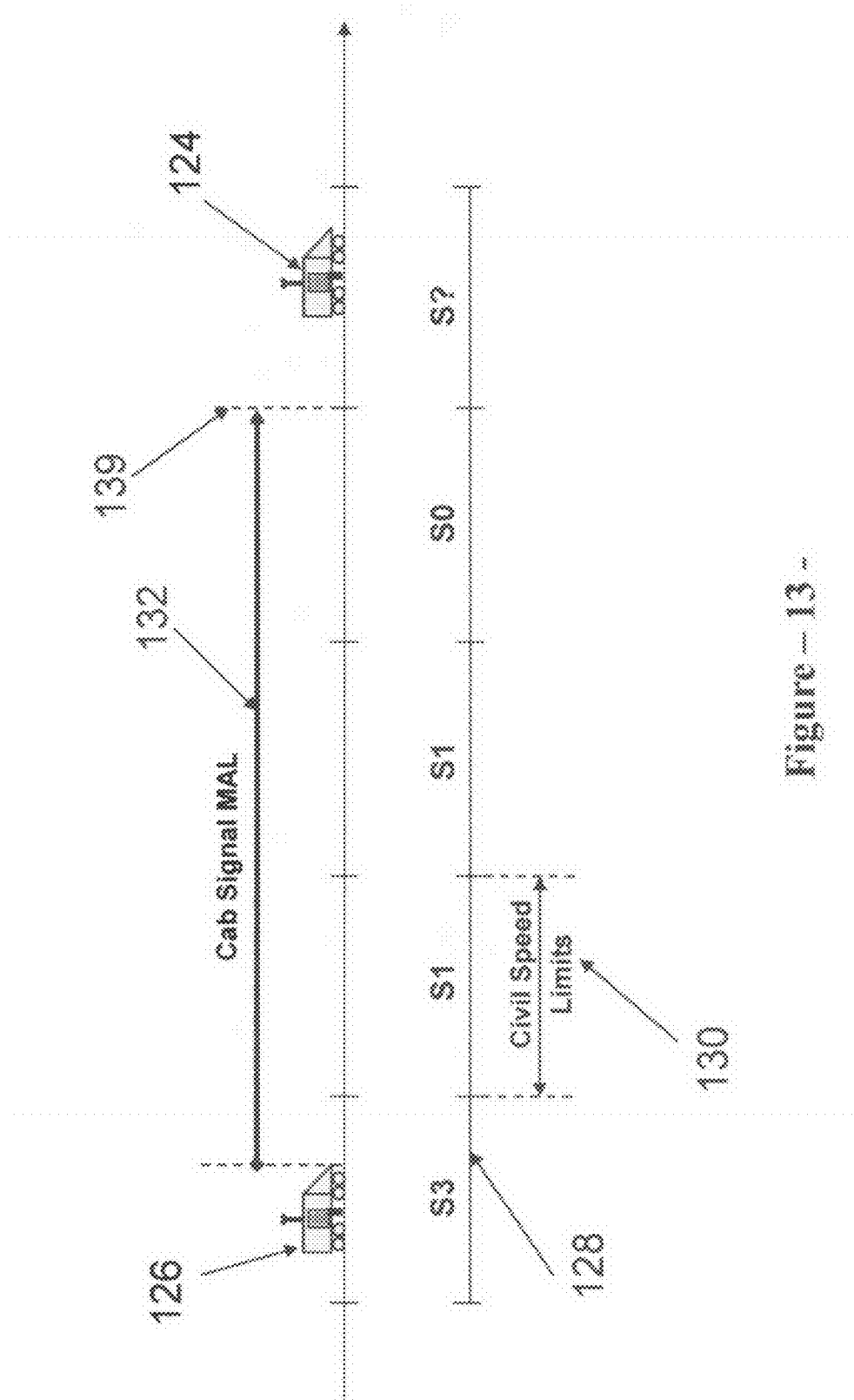
Figure — 13 —

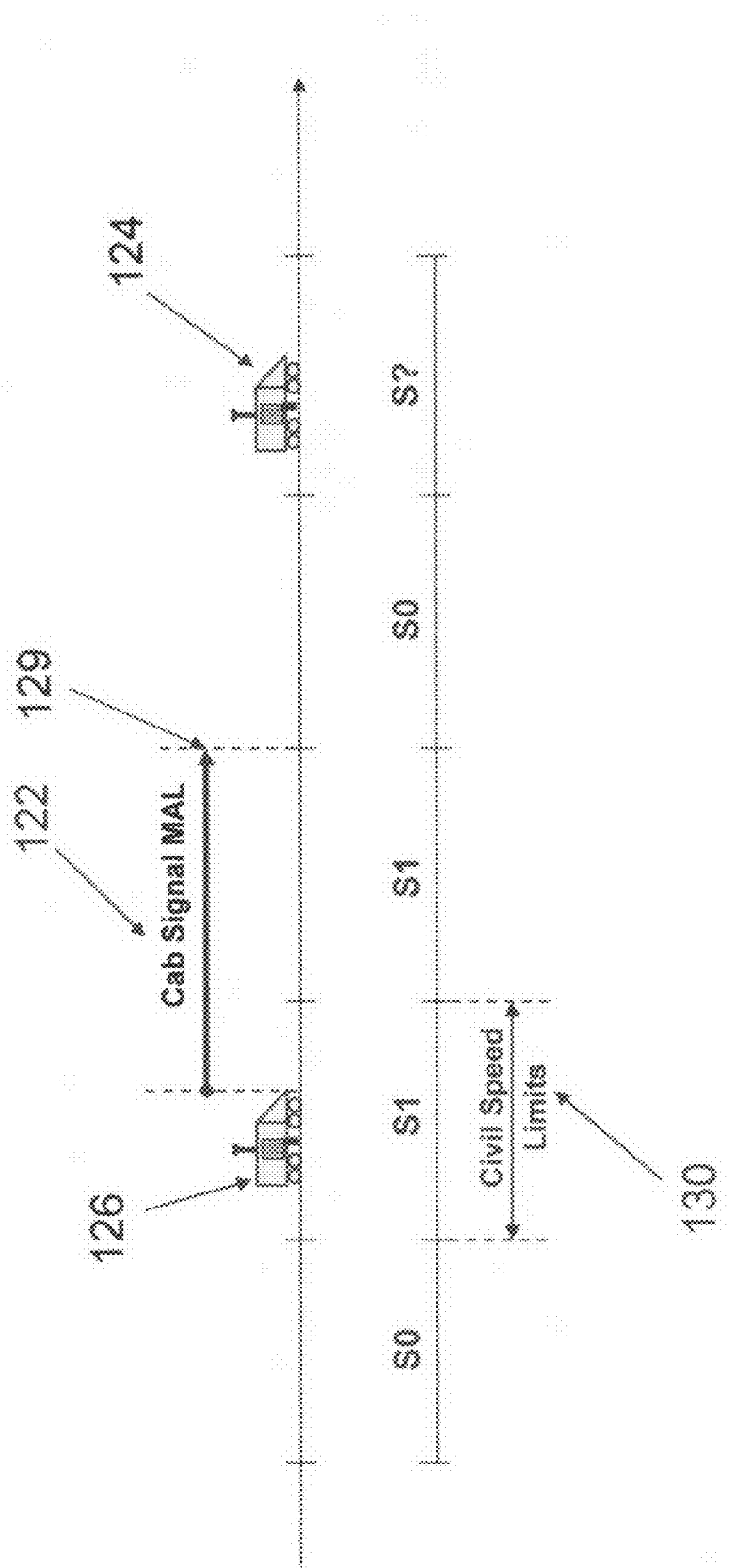
Figure — 14 —

METHOD AND APPARATUS FOR A HYBRID TRAIN CONTROL DEVICE

PARENT CASE TEXT

This is a continuation application of patent application, U.S. Ser. No. 12/454,398, filed in the Patent Office on May 19, 2009 now U.S. Pat. No. 8,200,380. All of the patent applications identified in this paragraph are incorporated by reference herein in their entirety.

BACKGROUND OF THE INVENTION

1. Field of the Invention

This invention relates generally to train control systems, and more specifically to a train control system that combines certain structures of cab-signaling technology with structures used in communication based train control (CBTC) technology. A hybrid train control system employs traditional wayside fixed blocks with associated cab-signal control devices, as well as intelligent CBTC carborne equipment. The cab-signal control devices generate discrete speed commands that are injected into the running rails of the various cab-signaling blocks. In turn, an intelligent CBTC carborne device determines the location of the associated train, and generates a movement authority limit (MAL) based on the speed commands received from the wayside cab-signaling devices.

2. Description of Prior Art

Cab-signaling technology is well known, and has evolved from fixed block, wayside signaling. Typically, a cab-signal system includes wayside elements that generate discrete speed commands based on a number of factors that include train detection data, civil speed limits, train characteristics, and track geometry data. The speed commands are injected into the running rails of the various cab-signaling blocks, and are received by trains operating on these blocks via pickup coils. A cab-signal system also includes carborne devices that present the speed information to train operators, and which ensure that the actual speed of a train does not exceed the speed received from the wayside.

CBTC technology is also known in the art, and has been gaining popularity as the technology of choice for new transit properties. A CBTC system is based on continuous two-way communications between intelligent trains and Zone controllers on the wayside. An intelligent train determines its own location, and generates and enforces a safe speed profile. There are a number of structures known in the art for a train to determine its own location independent of track circuits. One such structure uses a plurality of passive transponders that are located on the track between the rails to provide reference locations to approaching trains. Using a speed measurement system, such as a tachometer, the vital onboard computer continuously calculates the location and speed of the train between transponders.

The operation of CBTC is based on the moving block principle, which requires trains in an area to continuously report their locations to a Zone Controller. In turn, the Zone Controller transmits to all trains in the area a data map that contains the topography of the tracks (i.e., grades, curves, super-elevation, etc.), the civil speed limits, and the locations of wayside signal equipment. The Zone controller, also, tracks all trains in its area, calculates and transmits to each train a movement authority limit. A movement authority is normally limited by a train ahead, a wayside signal displaying a stop indication, a failed track circuit, an end of track, or the like. Upon receiving a movement authority limit, the onboard computer generates a speed profile (speed vs. distance curve) that takes into account the limit of the movement authority, the civil speed limits, the topography of the track, and the braking characteristics of the train. The onboard computer, also, ensures that the actual speed of the train does not exceed the safe speed limit.

CBTC has a number of advantages over cab-signaling technology, including shorter headways, enforcement of temporary speed limits, and enabling trains with different traction and braking characteristics to operate on the same line.

While the benefits and advantages of CBTC are well known, it is difficult to migrate a cab-signaling installation to a CBTC installation. Also, when implementing an extension to an existing line controlled by cab-signaling, a transit or a rail property is normally limited to a single choice, namely to use the same train control technology that is used on the existing line. In addition, it is desirable to standardize the man-machine-interface provided by cab-signaling and CBTC systems. Further, it desirable to achieve a certain level of interoperability between cab-signaling and CBTC. The current invention provides a structure that facilitates the migration from cab-signaling to CBTC, enables the use of CBTC technology on an extension of a line that is controlled by cab-signaling, provides a man-machine-interface for cab-signaling systems that is based on the distance-to-go format, and enables CBTC equipped trains to operate with wayside cab-signaling devices.

OBJECT OF THE INVENTION

This invention relates to train control systems, and in particular to a hybrid train control system that integrates conventional wayside cab-signaling devices with CBTC onboard computers. Accordingly, it is an object of the current invention to provide a method to translate speed limit information generated by cab-signaling equipment into movement authority limits.

It is another object of this invention to provide an onboard train control device that receives speed limit information from wayside signal control devices, and generates a movement authority limit that corresponds to the received speed information, based on the current location of the train.

It is also an object of this invention to provide an onboard train control device that receives speed limit information from wayside cab-signaling devices, and calculates a range of location for the train ahead based on the speed limit information received from wayside devices, the current location of the train, and a vital data base stored onboard that includes the topography of the track, civil speed limits, and the location of wayside signal equipment.

It is still an object of this invention to provide an onboard train control device that receives speed limit information from wayside cab-signaling devices, and provides a positive stop operation in the form of a movement authority limit.

It is another object of the invention to provide an onboard train control device that receives speed limit information from wayside cab-signaling devices, and provides a positive stop operation in the form of a movement authority limit at locations identified in an on-board data base.

It is a further object of this invention to provide an onboard train control device that receives speed limit information from wayside cab-signaling devices, and calculates corresponding movement authority limits for the train such that an improvement in the operating headway provided by the wayside cab-signaling system is achieved.

It is another object of this invention to provide an onboard train control device that receives speed limit information from wayside cab-signaling devices, and which provides a man-machine-interface that is compatible with a CBTC man-machine-interface.

It is also an object of this invention to provide an onboard train control device that receives speed limit information from wayside cab-signaling devices, and calculates corresponding movement authority limits, wherein the allowable safe speed limits are based on temporary speed restrictions received from an Automatic Train Supervision system.

It is still an object of this invention to provide a wayside train control device that controls an area of a railroad, and which has two way communications with trains operating in that area, and which receives location information from said trains, and which also receives speed limit information from a plurality of wayside cab-signaling devices, and which issues movement authority limits to said trains, wherein the speed limit information represents the allowed speeds in cab-signaling blocks that are determined by the cab-signaling devices based on the location of the trains in the area.

It is also an object of this invention to provide an onboard train control device that operates in both cab-signaling and CBTC territory, and which provides a uniform man-machine-interface in the form of a movement authority limit.

It is another object of this invention to provide an onboard train control device that receives speed limit information from wayside cab-signaling devices, and which calculates corresponding movement authority limits and allowable speed limits based on the specific traction and braking characteristics of the train, and civil speed limits stored in an onboard vital data base.

It is yet an object of this invention to provide an onboard train control device that receives speed limit information from wayside cab-signaling devices, as well as movement authority limits from wayside zone controllers, and which calculates corresponding movement authority limits for the train based on a predetermined criterion.

It is also an object of this invention to provide an onboard train control device that receives speed limit information from wayside cab-signaling devices, and which includes a plurality of modules to interface the control device with a plurality of cab-signaling systems.

It is still an object of this invention to provide an onboard train control device that receives speed limit information from wayside cab-signaling devices, and which also receives information related to the states of interlocking devices in the area, and calculates corresponding movement authority limits that reflect said states of interlocking devices.

It is a further object of this invention to provide an onboard train control device that receives speed limit information from wayside cab-signaling devices, receives train location information from an onboard train location determination system, and which calculates corresponding movement authority limits based on one or a plurality of lookup tables.

It is another object of this invention to provide an onboard train control device that receives speed limit information from wayside cab-signaling devices, and which translates the speed limit information into an obstruction location that defines a movement authority for the train.

It is also an object of this invention to provide an onboard train control device that receives a sequence of speed limit commands from wayside devices as the train moves through wayside cab-signaling blocks, and generates safe movement authority limits that are based on the design criteria for the wayside cab-signaling blocks, the configuration of the wayside cab-signaling blocks, the location of wayside interlocking devices, and the failure modes of the wayside cab-signaling devices.

It is still an object of the current invention to provide an onboard train control device that receives speed limit information from wayside devices, and translates these speed limits into movement authority limits in order to provide a train control system that is independent of the design assumptions for the wayside cab-signaling block design.

It is a further object of the invention to provide an onboard train control device that receives speed limit information from wayside devices, and translates these speed limits into movement authority limits, and then generates an on-board stopping profile that reflects civil speed limits included in an onboard data base.

It is also an object of the invention to provide an onboard train control device that receives speed limit information from wayside devices, and translates these speed limits into movement authority limits based in part on the transition between specific speed limits in two adjacent cab-signaling blocks.

BRIEF SUMMARY OF THE INVENTION

The foregoing and other objects of the invention are achieved in accordance with a preferred embodiment of the invention that provides a hybrid train control system that integrates conventional wayside cab-signaling devices with CBTC onboard computers. The onboard CBTC computers could also communicate with an Automatic Train Supervision System (ATS), which controls wayside interlocking equipment, as well as provides service delivery functionalities. The ATS system provides information related to temporary speed restrictions, work zone limits, and status of interlocking devices.

The configuration of an onboard CBTC device is similar to conventional vital onboard CBTC computers, and includes an independent location and speed determination subsystem, an interface to the traction, braking and other car subsystems, a vital data base that includes data related to track topography, civil speed limits, and location of wayside signal devices. In addition, the onboard CBTC device includes an interface to a cab-signaling pickup coil that receives wayside speed limit information coded in electrical signals that are injected through the running rails. For the preferred embodiment, the location determination subsystem is based on a plurality of transponders located on the track. Passive transponders are used to provide reference locations to the on-board location and speed determination subsystem. Between transponders, an odometry device continuously calculates train location and speed. Further, dynamic transponders could be used at home signal locations to provide vital route information to the on-board equipment.

It should be noted that the disclosure of a transponder based system to provide an independent location and speed determination is being provided for the purpose of describing the preferred embodiment, and is not intended to limit the invention herein. As would be appreciated by a person skilled in the art, any location and speed determination system that is independent of the wayside track circuits could be used with this invention. Examples of such location and speed determination subsystems include FIG. 8 inductive loops, radio triangulation devices, global positioning devices (GPS), or the like.

The methodology described in the preferred embodiment is based on the conversion of received cab-signal speed codes into movement authority limits. There are two main steps in implementing such conversion. First, the on-board CBTC equipment determines the cab-signaling block where the front end of the train is currently located. This determination is made based on the current location of the train (as calculated by the on-board location subsystem), and the vital data base information. The second step is to determine the block boundary location for the cab-signaling block where a track obstruction exists. A track obstruction could be a train ahead, a stop signal, a failed wayside detection block, an end of track, a temporary track block, or the like. This determination of block boundary location could be implemented using a lookup table that reflects the wayside cab-signaling speed codes versus the statuses of the various wayside detection blocks. Alternatively, said block boundary location determination could be implemented by an algorithm that employs cab-signaling speed code received, current cab-signaling block, and cab-signaling design parameters (i.e. train characteristics, track profile data, reaction times, train resistance formulas used, etc.).

Upon the identification of the cab-signaling block where a track obstruction exists, the on-board CBTC computer will generate a movement authority limit up to the block entry location for this cab-signaling block. A buffer zone is provided before said block entry location to ensure minimum safe separation to a train located at the beginning of the block where the track obstruction is located. This movement authority limit is enforced by the on-board CBTC equipment. Similar to a CBTC operation, the on-board vital controller will generate a stopping profile (speed/distance curve) to control the speed of the train, and enforce the stopping of the train at the end of the movement authority limit. Such stopping profile incorporates the civil speed limits present in the wayside signal configuration. The on-board vital controller also provides over-speed protection by ensuring that the actual speed of the train does not exceed the allowable speed limit.

It should be noted that the generation of the movement authority limit is a dynamic process that corresponds directly to the cab-signaling speed code received from the wayside devices. Within a block, the on-board CBTC equipment will respond to any change in the received cab-signaling speed code limit. A more restrictive speed code will result in a truncation of the movement authority limit. Alternatively, a more permissive speed code will result in an expanded movement authority limit.

It should also be noted that when a train enters a new block, the norm is that the movement authority limit remains the same. The exception is when the track obstruction limiting the movement authority moves to a different cab-signaling block simultaneously with the movement of the train to the new block. This means that under normal operation, the dynamic changes in movement authorities will most likely occur within the boundaries of the various blocks.

This hybrid architecture provides a number of safety and operational benefits. First, a movement authority normally extends beyond the entry boundary of the block with a "stop" or "stop and proceed" speed code. More specifically the movement authority limit could extend to the exit boundary of the block in the approach to the block where the obstruction exists. Such extension of the movement authority limit provides an enhancement of the existing throughput. Second, this hybrid architecture can be used to convert an existing "stop and proceed" operation to a "positive stop" operation by the inherent nature of the movement authority limit. In such applications, the hybrid architecture could be used to enhance safety of operation.

This concept could also be implemented such that a combination of "positive stop," and "stop and proceed" operations are provided at different geographical locations based on a data base parameter. For example, a "positive stop" operation could be provided at home signal locations. At the same time, "stop and proceed" operation could be provided at the boundary of certain blocks where it is desired to close in on a train ahead under the protection of the operating rules. This is implemented by a data base parameter that controls the selection of either a "positive stop" operation, or a "stop and proceed" operation at the end of a movement authority limit. Further, for systems where an ATS subsystem is employed, this data base parameter could be enabled by the ATS dispatcher at a central control location. An acknowledge function is then provided on-board the train to ensure that the train operator is aware of the "stop and proceed" operation at this location.

Other benefits of this architecture include providing smoother operation through the elimination of code change points at the boundaries between the various blocks, making the train propulsion and braking characteristics independent of the wayside cab-signaling block design, and facilitating the transition from cab-signaling to CBTC operation by enabling mixed fleet operation (i.e. cab-signaling trains operating on the same track with CBTC trains). Another type of mixed fleet operation could be provided where, for example, it is desired to operate freight trains on the same tracks with commuter trains. In such a case, each type of train will operate on the line based on its own propulsion and braking characteristics, and independent of the assumptions made for the wayside cab-signaling block design.

It should be noted that the concept of hybrid architecture could be implemented on an extension of an existing cab-signaling line. The line extension will be equipped with wayside CBTC zone controllers. New trains operating on the extension are equipped with the hybrid on-board device, and are able to operate on both the main line and extension tracks using a movement authority type operation. Old trains equipped with on-board cab-signaling equipment will continue to operate on the main line tracks in a mixed fleet operation, but cannot operate on the new extension tracks. Obviously, if it is desired to operate the old trains on the extension tracks, then they must be retrofitted with hybrid on-board equipment.

It should also be noted that this hybrid architecture could be used with cab-signaling systems that employ the running rails to transmit speed information to trains, or with cab-signaling systems that employ inductive loops. This architecture could also be used with cab-signaling systems that employ a distant-to-go type operation within a block.

Another advantage of this hybrid architecture is to enable trains with different traction and breaking characteristics to operate with existing cab-signaling wayside installations. In effect, this architecture will make train control independent of the assumptions used to design the wayside cab-signaling block layout.

This hybrid architecture also provides conventional CBTC operation in areas equipped with wayside zone controllers. In such areas, a train continuously transmits its location to the wayside zone controller via the data communication subsystem. In turn, a zone controller tracks the trains in an area, and issues a movement authority to a train based on the location of the track obstruction ahead. This movement authority limit is transmitted to the train via the data communication network. The on-board computer then generates and enforces a stopping profile that corresponds to the received movement authority limit.

BRIEF DESCRIPTION OF THE DRAWINGS

These and other more detailed and specific objectives will be disclosed in the course of the following description taken in conjunction with the accompanying drawings wherein:

FIG. 1 is a block diagram of a hybrid cab-signaling/CBTC onboard unit showing a cab-signal interface in accordance with the invention.

FIG. 2 indicates a block diagram of the process used to convert a cab-signaling speed limit into a movement authority limit in accordance with the invention.

FIG. 3 shows a two step process to convert a cab-signaling speed limit into a movement authority limit using lookup tables.

FIG. 4 shows a sequence of cab-signaling blocks, and demonstrates the process used to map the CBTC train location to said blocks for the purpose of identifying which block is occupied by the train.

FIG. 5 shows a lookup table to generate movement authority limits that correspond to received cab-signaling speed codes, for various wayside blocks.

FIG. 6 shows the cab-signaling movement authority limits for consecutive blocks relative to the position of a train ahead.

FIG. 7 shows the cab-signaling movement authority limits for consecutive blocks relative to the position of a wayside signal that displays a stop aspect.

FIG. 8 indicates a wayside cab-signaling block layout that employs "no code" for "stop & proceed" operation.

FIG. 9 shows a cab-signaling movement authority relative to a CBTC movement authority for the condition of a train ahead.

FIG. 10 shows a cab-signaling movement authority relative to a CBTC movement authority for the condition of a signal ahead displaying a stop aspect.

FIG. 11 shows a lookup table to generate movement authority limits that correspond to received cab-signaling speed codes, for various wayside blocks, as well as type of operation desired at each block when a no code condition exists.

FIGS. 12-14 show an example of the operation of the preferred embodiment according to the current invention in a section of the track where a civil speed limit is present.

DESCRIPTION OF THE PREFERRED EMBODIMENT

The preferred embodiment of the present invention describes a structure, and/or a method to provide safe operation of trains over sections of cab-signaling track territory. The main concept of the present invention is to employ cab-signaling speed codes received from wayside cab-signaling devices to generate corresponding movement authority limits on board trains. In effect the structure used by the present invention is a hybrid architecture that combines wayside cab-signaling devices, and onboard CBTC controller.

The present invention maintains the running rails as an integral part of the train control system, while providing many of the advantages of CBTC operation. The preferred embodiment also employs a vital on-board data base that includes track topography information, cab-signaling block configuration, location of wayside signal devices, limits of station platforms, and civil speed limits A cab-signaling pickup coil, together with a cab-signaling decoder, is used to detect and decode the cab-signaling code rate present in the running rails. Further, a reverse cab-signaling design process is used to determine the location of the obstacle corresponding to the received cab-signaling rate.

Referring now to the drawings where the illustrations are for the purpose of describing the preferred embodiment of the invention and are not intended to limit the invention hereto, FIG. 1 is a block diagram of the onboard train control device in accordance with the preferred embodiment of the invention. It includes a vital onboard controller (VOBC) 10, which includes a vital data base 20. The VOBC 10 interfaces with a transponder reader 12, an odometry device 14, a data communication unit 18, the car propulsion and braking systems 16, and a cab-signaling interface unit 22. The transponder reader 12 receives location information from passive transponders installed on the tracks, and provides reference location information to the on-board location determination subsystem. The transponder reader 12 could also provide route data based on information provided by wayside interlocking devices to dynamic transponders located at said interlocking devices. The odometry device 14 provides location and/or speed measurement functions to the VOBC 10 so that the VOBC 10 can continuously determines the location and speed of the train as the train moves on the track. Similar to traditional CBTC systems, the reference location received from the transponder reader 12 is used to reset any uncertainty in the calculated train location.

The data communication unit 18 is an optional device, and is used in embodiments that employ wayside zone controllers. In such a case, the VOBC 10 receives CBTC movement authority limits (MAL) from wayside zone controllers, and transmits the train location to said zone controllers via the data communication unit 18. The cab-signal interface unit 22 provides the cab-signaling speed code signal detected in the rails to the VOBC 10. This signal is normally in the form of a modulated carrier frequency. The code rates normally correspond to the cab-signaling speed limits in the wayside cab-signaling blocks. The decoding or demodulation of the received speed signal could be performed as part of the cab-signaling interface unit 22, or could be integrated in the VOBC functions.

FIG. 2 describes the general process of translating the decoded cab-signaling speed 30 into a cab-signaling movement authority limit 32. In effect, the vital control logic embedded in the VOBC 10 generates a movement authority limit 32 that corresponds to the received cab-signaling speed limit 30 using a reverse cab-signaling block design process 24. The data required for such process includes the CBTC train location 28, the cab-signaling block boundaries 25, the decoded cab-signaling speed 30, and route data 26 if required. The CBTC train location 28 is generated by the on-board location determination subsystem based on information received from the transponder reader 12 and the odometry unit 14.

It should be noted that the labeling of the train location data 28 as CBTC train location is disclosed for the purposes of describing the preferred embodiment, which has hybrid architecture so that the on-board VOBC 10 can operate both in cab-signaling and CBTC territory. As would be appreciated by a person skilled in the art, this concept could be used to operate entirely in cab-signaling territory, and in such a case the CBTC train location data 28 could be simply labeled on-board train location.

The cab-signaling block boundaries data is stored in the on-board vital data base as part of a dataset that includes the topography of the track (i.e. track stationing information, grade information, curve information, super elevation data, etc.), civil speed limits, location of wayside signal equipment, location of station platforms, etc.

The route data 26 includes the position of wayside track switches, and the status of wayside signals. This route data 26 is not normally required for the determination of a cab-signaling movement authority limit except in wayside cab-signaling installations where a cab-signaling speed code is based in-part on a civil speed limit present at an interlocking route (for example, when a train proceeds over a diverging route).

Route data 26 could also be required to provide information to operating personnel on the train operator display (TOD).

Depending on the application requirements, the route data 26 could be provided by wayside transponders, from a wayside zone controller, or from the ATS subsystem using the data communication unit 18. The route data 26 could also be implied from the received cab-signaling speed code 30 in conjunction with information stored in the on-board data base 20.

The reverse cab-signaling design process 24 could be implemented by one of a plurality of structures. A software algorithm could be provided to identify the location of the block where an obstacle exists (train ahead, stop signal, end of track, etc.). Such software algorithm will be based on track topography data, and design assumptions used for the wayside cab-signaling block design. For example, train traction or propulsion characteristics, safe braking model, reaction times, etc. A second structure is shown in FIG. 3, and is based on a two step process that employs lookup tables.

In the first step 34, lookup table 1 is used to identify the wayside block 38 where the front end of the train is located. This lookup table uses the CBTC train location 28 as determined by the on-board train location subsystem, and the boundary location information for the wayside blocks 40, which are provided by the on-board vital data base, to identify said wayside block 38. A graphical representation of this first step 34 is shown in FIG. 4. Wayside block $B_i$ 44, where the train is located, is determined by comparing the on-board train location 46 with the boundaries of the various wayside blocks. This process continues as the train moves in the established traffic direction 42.

In the second step 36 shown in FIG. 3, lookup table 2 is used to determine the cab-signaling movement authority limit 32. This lookup table uses the block information 38 determined in the first step, and the received cab-signaling speed code 30 to generate the cab-signaling MAL 32. FIG. 5 shows an example of a lookup table where $MAL_{i2}$ 56 represents the cab-signaling movement authority limit that corresponds to cab-signaling speed code $S_2$ 54 when the train is in block $B_i$ 52. As the train continues to move in the established direction of traffic 42, new movement authority will be generated based on the block identity, and the received speed code limit.

It should be noted, and as shown in FIG. 6, with a train 62 in block $B_{i+4}$ 64 traveling in the established direction of traffic 42, the movement authority limits $B_i$ 66, $B_{i+1}$ 68, $B_{i+2}$ 70, and $B_{i+3}$ 72 terminate at the same point, namely at the beginning of a buffer zone at the boundary between blocks $B_{i+3}$ & $B_{i+4}$. This means that as the following train 65 crosses to a new block, the movement authority for the train will most likely remains the same. The exception occurs when simultaneously with the following train 65 crossing to a new block, the preceding train 62 also moves to a new block. This also means that a change in the movement authority limit for a train will most likely occur within a block rather than at a block boundary. FIG. 7 shows that the same operation indicated in FIG. 6 occurs when the movement authorities 78, 80, 82 & 84 are limited by a signal 74 displaying a stop aspect.

It should also be noted that a movement authority is truncated only in the event of a failure, or if an unusual operating condition occurs. For example, a track circuit failure, or a loss of speed code will result in a truncation of movement authority. Also, the cancellation or downgrading of an aspect at a wayside signal will cause the movement authority to be truncated.

A movement authority limit generated by the VOBC 10, or received from the wayside zone controller via the CBTC data communication subsystem 18 is enforced by the on-board VOBC 10. Similar to a CBTC operation, the vital on-board controller 10 will generate a stopping profile (speed/distance curve) to control the speed of the train, and enforce the stopping of the train at the end of the movement authority limit. Such stopping profile incorporates the civil speed limits present in the wayside signal configuration, and stored in the on-board vital data base 20. The VOBC 10 also provides over-speed protection by ensuring that the actual speed of the train as measured by the odometry module 14 does not exceed the allowable speed limit determined by the generated stopping profile. In the event of an over-speed condition, the VOBC will activate the train brake subsystem.

In overlap areas between cab-signaling and CBTC territories, it is possible to receive both a movement authority from a wayside zone controller, and a cab-signaling speed code limit from cab-signaling wayside devices. In such a case, and since both generated and received movement authority limits are vital, the more permissive movement authority limit is used. As would be appreciated by a person skilled in the art, an on-board logic could be added to define precisely the demarcation point between cab-signaling based operation and CBTC based operation. Such logic will depend on information stored in the vital data base.

The hybrid architecture shown in FIG. 1 for the preferred embodiment could be implemented with both a cab-signaling system that employs a dedicated code "S0" for a "positive stop" operation, as well as a cab-signaling system that employs a no code "NC" to provide a "stop & proceed" operation. FIG. 8 demonstrates how the concept presented herein is implemented when no code "NC" 92 is used as part of normal operation. More specifically, the system must differentiate between the NC 92 corresponding to "stop & proceed" operation, and a no code resulting from a loss of cab-signaling code in a block, i.e. a failure caused by either trackside equipment or in the on-board cab-signaling interface unit 22.

As shown in FIG. 8, when a train 86 crosses the boundary point 93 between a block that has a valid cab-signaling code 95 and a block with no code 92, it is desirable to maintain a valid movement authority to the end of the block that has a no code 92. This is possible due to the fact that prior to the point in time when the train 86 crosses 94 the boundary point 93, it is receiving a valid cab-signaling speed code S1, which indicates that the no code block 92 is vacant. This is different from the condition when a valid cab-signaling speed code S3, S2 or S1 is lost within a block limit resulting in a no code condition. In such a case, the no code condition will result in a truncated movement authority. Therefore, to implement this architecture for a cab-signaling system that employs no code for a "stop & proceed" operation, the on-board data base is used to differentiate between a no code condition within a block boundary, and a no code condition 92 at the boundary of a block 93 where a no code condition is expected. In this case, the transition from a first speed code to a no code at a block boundary is used as a pre-requisite to maintain the movement authority to its current limit.

As shown in FIG. 9, the architecture disclosed in the preferred embodiment will result in a headway improvement 106 in cab-signaling systems that provide positive stop operation. A train 98 following a preceding train 108 normally stops at the beginning of a block 104 with S0 code. The cab-signaling movement authority 100 allows the train to proceed to the end of the block. The extent of such headway improvement 106 is dependent on the wayside cab-signaling block design. It should be noted that the headway improvement 106 in the case where the movement authority is limited by a train ahead 108 is less that the headway improvement provided by a CBTC movement authority 102. However, in the case where the movement authority is limited by a wayside signal displaying a stop aspect 118, as shown in FIG. 10, the headway improvement 120 is the same for both the cab-signaling based operation as measured by its movement authority 116, and the CBTC based operation as measured by its movement authority 114.

It should also be noted that the architecture shown in FIG. 1 provides a simple and effective way to convert a "stop & proceed" operation to a "positive stop" operation. As shown in FIG. 8, a cab-signaling MAL 91 will ensure that the following train 86 stops at the end of the block with no code condition 92, rather than a "stop & proceed" operation 90 that allows a train to close in on the preceding train 88 under the protection of the operating rules. This hybrid architecture will therefore enhance the safety of operation by reducing the reliance on the operating rules employed in the "stop & proceed" operation, and by minimizing the probability of a human error.

Further, as shown in FIG. 11, the lookup table that provides the various movement authorities corresponding to received cab-signaling speed limits could be expanded to include the type of operation desired at each block when a no code condition is encountered. For example, a positive stop operation could be specified at the end of a block in approach to a home signal, or in approach to the end of track. Stop and proceed operation could be maintained at other blocks where it is operationally desirable to allow a train to close in on a train ahead. In addition, where an Automatic Train Supervision subsystem is used, and is communicating with the vital onboard computer 10, the "stop & proceed" operation could be enabled in the vital data base, but dynamically activated by the central ATS dispatcher. An acknowledgment function could then be implemented in the vital software of the VOBC 10 to ensure that the train operator is conscious of the "stop & proceed" operation at that location.

In certain cab-signaling installations, the calculation of the wayside cab-signaling speed code is based on track occupancies, status of wayside signal aspects as well as additional factors. These factors could include civil speed limits, and dynamic route information such as when the train operates over a diverging route. In such installations, additional onboard lookup tables and/or logic are provided to differentiate between a cab-signaling speed code that reflects a civil speed limit, and a cab-signaling speed code that reflects the position of a train ahead, or the condition of a wayside signal displaying a stop aspect.

FIGS. 12 & 13 demonstrate an example of a civil speed limit 130, which limits the speed code in the associated block 130 to S1 independent of the location of the train ahead 124. What is different between the two figures is the speed in the block 128 in the approach to the block 130 associated with the civil speed limit 130. In FIG. 12, the speed limit in the approach block 128 is S3, while in FIG. 13, the speed in said block is S2. The on-board logic recognizes that the transition from S2 to S1 at the border between the two blocks is a pre-requisite to maintain a cab-signaling MAL 122 to the end of the S0 block limit 129 as shown in FIG. 12. Alternatively, a transition from S3 to S1 will maintain a cab-signaling MAL 132 to the end of the S0 block as shown in FIG. 13.

It should be noted that if the train ahead 124 moves to a new block while the following train 126 is still in the block associated with the civil speed limit, then the cab-signaling MAL 122 will not advance, and will remain to the end of the S1 block 129 as shown in FIG. 14. This condition, however, will not adversely impact operation since the train 126 must comply with the civil speed limit 130 irrespective of the movement authority limit. As would be appreciated by a person skilled in the art, the configuration described in FIGS. 12-14 is only one example of various cab-signaling configurations with different civil speed limits that could be present at a particular line. Accordingly, as the case with traditional signal design applications, the specific design of the onboard logic will be customized to the specific wayside cab-signaling block configuration.

Similarly, additional lookup tables and/or logic are provided in applications where the train is operating in the approach to and on a diverging route. In such a case, the transition between various combinations of cab-signaling speed codes could imply the position of the wayside track switch. Alternatively, the position of the switch could be provided through a dynamic wayside transponder that is read by the on-board location subsystem. Also, in embodiments where an ATS subsystem is used, information related to the position of wayside switches could be transmitted to the train for non-vital functions applications such as providing route information on the train operator display.

As would be understood by those skilled in the art, alternate embodiments could be provided to implement the new concepts described herein. For example, different location subsystems could be used to determine the location of the train independent of the underlying fixed block detection system. Also, different algorithms could be used to provide a reverse cab-signaling block design on board. In addition, this hybrid architecture could be integrated in a wayside zone controller. In such a case, trains will transmit their on-board locations to the wayside zone controller. Similarly, the speed codes from the various wayside blocks are imputed to the zone controller. In turn, the zone controller will determine a movement authority limit based on the speed code in a certain block, and will transmit said movement authority limit to the train in than block via the CBTC data communication subsystem.

Furthermore, the onboard VOBC 10 could be implemented using a plurality of vital modules. These modules could be independent software modules operating on a common hardware platform, or each of the modules could operate on a separate hardware platform. In such an alternate embodiment, a first vital module will provide the function of location determination; a second vital module will provide the function of decoding a speed code, and converting it into a movement authority limit; and a third vital module will generate and enforce a stopping profile based on the generated movement authority limit. The second module could incorporate an algorithm that performs a reverse block design process, or in the alternative could employ a plurality of lookup tables.

Also, alternate vital programs may be utilized to implement the conversion of received cab-signaling speed codes into movement authority limits. Obviously these programs will vary from one another in some degree. However, it is well within the skill of the signal engineer to provide particular programs for implementing vital algorithms to achieve the functions described herein. It is also to be understood that the foregoing detailed description has been given for clearness of understanding only, and is intended to be exemplary of the invention while not limiting the invention to the exact embodiments shown. Obviously certain subsets, modifications, simplifications, variations and improvements will occur to those skilled in the art upon reading the foregoing. It is, therefore, to be understood that all such modifications, simplifications, variations and improvements have been deleted herein for the sake of conciseness and readability, but are properly within the scope and spirit of the following claims.

The invention claimed is:

1. A train control system interfacing with a cab-signaling train control system having a plurality of train track wayside cab-signaling blocks respectively for transmitting train permissible speed limit information associated with each block to a train on the train track, comprising:
 an on-board train control system having a train location determination subsystem, the on-board train control system capable of sending train location information and receiving movement authority limit information; the on-board train control system generating a train stopping profile used to control train movement, the generated stopping profile based at least in part on the respective determined train location and received movement authority limit information; and
 a wayside controller interfacing with the cab-signaling train control system cab-signaling blocks for receiving train permissible speed limit information; and that is communicatively coupled to the on-board train control system for sending movement authority limit information to the on-board train control system; the wayside controller generating the movement authority limit information based at least in part on the received train permissible speed limit information provided by the respective cab-signaling wayside blocks.

2. A train control system as recited in claim 1, wherein the movement authority generator utilizes a database having lookup tables to convert cab-signaling speed codes to corresponding movement authority limit information.

3. A train control system as recited in claim 2, wherein said lookup tables are used to determine the identity of the wayside blocks where trains are located.

4. A train control system as recited in claim 2, wherein said lookup tables determine a movement authority limit that corresponds to a wayside block identity and a cab-signaling speed code for the same wayside block.

5. A train control system as recited in claim 1, wherein the wayside controller determines the location of a track obstruction that corresponds to a received cab-signaling permissible speed limit speed code.

6. A train control system as recited in claim 1, wherein said location determination subsystem is transponder based.

7. A train control system interfacing with a cab-signaling train control system having a plurality of train track wayside cab-signaling blocks respectively for transmitting train permissible speed limit information associated with each block to a train on the train track, comprising:
 an on-board train control system having: a train location determination subsystem; an on-board train control system communications module for sending train location information and receiving movement authority limit information; and a control module for generating a train stopping profile used to control train movement, the generated stopping profile based at least in part on the respective determined train location and received movement authority information; and
 a wayside controller having: a wayside controller interface unit for receiving speed codes from cab-signaling train control system cab-signaling blocks; a wayside controller communications module that is communicatively coupled to the on-board train control communications module for sending movement authority limit information to the on-board train control system; and a movement authority generator module for generating the movement authority limits based at least in part on the received speed codes provided by the cab-signaling wayside blocks.

8. A train control system as recited in claim 7, wherein said movement authority generator module converts a permissible speed limit information speed code into a corresponding movement authority limit by accessing a database of lookup tables that correlate speed code and movement authority limit.

9. A train control system as recited in claim 7, wherein said movement authority generator module determines a location of a track obstruction that corresponds to a received cab-signaling permissible speed limit speed code.

10. A train control system as recited in claim 7, wherein said control module for generating a stopping profile enforces the movement authority limit and incorporates a data base relevant to train or railway operating conditions.

11. A train control system as recited in claim 10, wherein said data base includes information related to the topography of the railway tracks.

12. A train control system as recited in claim 10, wherein said data base includes information related to civil speed limits.

13. A train control system as recited in claim 10, wherein said data base includes information related to status of track switches.

14. A train control system interfacing with a cab-signaling train control system having a plurality of train track wayside cab-signaling blocks respectively for transmitting train permissible speed limit codes that are associated with each block to a train on the train track, comprising:
 an on-board train control system having: a train location determination subsystem; an on-board train control system communication module for sending train location information and receiving movement authority limit information; and a train stopping profile generation module for generating a stopping profile that is used to control train movement conformance within the movement authority limit information, the generated stopping profile based at least in part on the respective determined train location and received movement authority information; and
 a wayside controller having: a wayside controller interface unit for receiving train permissible speed limit codes from cab-signaling train control system cab-signaling blocks; a wayside controller communications module that is communicatively coupled to the on-board train control communications module for sending movement authority limit information to the on-board train control system; and a movement authority generator module for generating the movement authority limit information based at least in part on the received train permissible speed limit codes provided by the cab-signaling wayside blocks, the movement authority generator utilizing a database having a lookup table to convert cab-signaling speed codes to corresponding movement authority limit information.

15. A train control system as recited in claim 14, operatively coupled to an automatic train supervision subsystem.

* * * * *